United States Patent Office 3,151,182
Patented Sept. 29, 1964

3,151,182
N-ALLYLOXYMETHYL MALEIMIDE, AND HOMO-
POLYMERS AND COPOLYMERS THEREOF
Charles H. Alexander, Bethany, Conn., assignor to United
States Rubber Company, New York, N.Y., a corporation of New Jersey
No Drawing. Filed Mar. 17, 1961, Ser. No. 96,368
5 Claims. (Cl. 260—868)

This invention relates to a novel chemical compound, N-allyloxymethyl maleimide, its preparation and its polymers and copolymers. The invention further relates to novel polymerizable compositions and to the resulting resins obtained therefrom.

The novel monomeric compound of this invention is conveniently prepared from allyl alcohol and N-halomethyl maleimide, the latter being made as described by Tawney, U.S. Patent No. 2,640,832.

The reaction may be represented as follows:

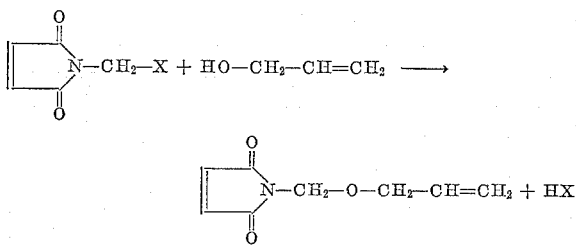

wherein X is a halogen, preferably chlorine or bromine.

The progress of the reaction for the preparation of the monomer will be enhanced by the addition of a "halogen acid acceptor" such as sodium hydroxide, potassium hydroxide, quaternary amine hydroxides, sodium bicarbonate, sodium carbonate and the like. The term "halogen acid acceptor" as used herein means those compounds which may be added to the reaction mixture to combine or react with the halogen acid that is formed during the progress of the reaction so that the equilibrium of the reaction is shifted in a manner favoring completion of the reaction. The amount of halogen acid acceptor that may be employed is not critical, but, for optimum conditions, the theoretical number of moles of halogen acid liberated during the course of the reaction can easily be calculated and, thus, the corresponding amount of halogen acid acceptor that need be employed can readily be determined. The halogen acid acceptor need not be soluble in the particular solvent used.

The reaction represented above for the preparation of the monomer may be carried out by reacting allyl alcohol with N-halomethyl maleimide in benzene. The use of benzene, however, is not critical. Other organic liquids, e.g., ether, acetone and carbon tetrachloride, which are inert in this reaction, also may be used.

The monomer may also be prepared by contacting allyl alcohol and N-halomethyl maleimide in organic liquids having a tertiary amine like structure. Such liquids are suitable for their dual action, namely, as a solvent and as a halogen acid acceptor. They may be heterocyclic, such as N-alkyl piperidine, N-alkyl morpholine, pyridine, lutidine, or quinoline; aliphatic amines such as triethyl amine, tributyl amine or, in general, trialkyl amines; dialkyl aromatic amines such as diethyl aniline or dimethyl aniline.

In place of a halogen acid acceptor, the reaction may be performed in the presence of a catalytic amount of a mild Lewis acid catalyst, such as zinc chloride, ferrous chloride, cadmium chloride and the like. The amount of catalyst that may be employed is not critical but, naturally, would depend on such factors as the strength and efficiency of the catalyst, the rate of reaction desired, and so on.

The temperature of the reaction can be varied between —20° C. and the reflux temperature of the mixture depending upon the solvent employed. In general, temperatures of 0° C. to 30° C. are preferred.

While the proportion of the reactants is not critical, the use of an excess of allyl alcohol is preferred because it is somewhat difficult to separate N-allyloxymethyl maleimide from unreacted N-halomethyl maleimide. Any unreacted allyl alcohol can be removed simply by washing the reaction solution with cold water.

The monomer, N-allyloxymethyl maleimide, produced in accordance with this invention may readily be polymerized to yield useful polymers by means of polymerization techniques known in the art.

N-allyloxymethyl maleimide copolymerizes with components selected from the group consisting of (A) an unsaturated polyester (alkyd), which may be prepared in known manner (e.g., according to Knapp, U.S. Patent No. 2,671,070) by reacting a glycol with a compound selected from the class consisting of alpha, beta-ethylenically unsaturated dicarboxylic acids and anhydrides thereof in the presence or absence of other modifying components, and (B) a mixture of said alkyd with triallyl cyanurate. The heat-resistant copolymeric resins obtained therefrom are useful in the production of glass cloth laminates.

In copolymerizing N-allyloxymethyl maleimide with an unsaturated polyester (alkyd), the percent of alkyd may range from about 20 percent to about 75 percent by weight of copolymer, the N-allyloxymethyl maleimide correspondingly ranging from about 80 percent to about 25 percent by weight of copolymer. If there is more than 75 percent of alkyd, the viscosity of the liquid resin mixture will be such that handling is quite difficult.

In copolymerizing N-allyloxymethyl maleimide with a mixture of said alkyd and triallyl cyanurate, the percent of alkyd again may range from about 20 percent to about 75 percent by weight of copolymer. The balance of the copolymer, consisting of N-allyloxymethyl maleimide and triallyl cyanurate, may be comprised of from 10 percent to 90 percent by weight of N-allyloxymethyl maleimide with a corresponding 90 percent to 10 percent by weight of triallyl cyanurate. In the production of glass cloth laminates, a preferred copolymeric composition consists of 50 percent by weight of alkyd, 25 percent by weight of N-allyloxymethyl maleimide and 25 percent by weight of triallyl cyanurate.

The polymerization reactions are initiated by free radicals which may be supplied by incorporating into the reaction mass as a catalyst an organic peroxide or hydroperoxide. Among the most useful peroxidic catalysts are benzoyl peroxide, acetyl peroxide, ditertiary butyl peroxide, tertiary butyl perbenzoate and ketone peroxides. Alternatively, the necessary free radicals may be supplied by irradiating the reaction mass with ultra violet light.

With the foregoing general discussion in mind, there are given herewith detailed examples of the practice of this invention.

*Example 1.—Preparation of N-Allyloxymethyl Maleimide*

A 50 percent aqueous solution of sodium hydroxide (80.0 grams, 1 mole) was added drop-wise to an agitated solution of allyl alcohol (174.0 grams, 3 moles) and N-chloromethyl maleimide (145.5 grams, 1 mole) in 250 grams of benzene at a temperature of 5–13° C. over a period of one hour. Stirring was continued for an additional three hours at 5–15° C. at which time the reaction solution was washed three times with an equal volume of cold water to remove the bulk of unreacted allyl alcohol. The solution was then dried over anhydrous sodium sulfate. The dehydrating agent was removed by filtration and the benzene removed at reduced pressure. The reaction product was distilled at 79–84° C. and 0.4–05 mm. pressure. A trace of tertiary butyl catechol was added to the reaction product before distillation to inhibit possible homopolymerization. There was obtained 50.1 grams of N-allyloxymethyl maleimide.

*Analysis.*—Calculated for $C_8H_9NO_3$, nitrogen 8.39%. Found, nitrogen 8.45%.

This compound can also be made from allyl alcohol and N-bromomethyl maleimide by a similar procedure.

*Example 2.—Preparation of N-Allyloxymethyl Maleimide*

A reaction mixture of 67 grams (0.46 mole) N-chloromethyl maleimide in 174 grams (3 moles) of allyl alcohol was prepared in a 500 ml. flask. To this was added 0.1 gram anhydrous zinc chloride and the mixture agitated until solution resulted. The reaction solution was allowed to stand at the ambient temperature of the room for seven days with occasional shaking by hand. At this time 200 ml. of benzene was added to the reaction solution. The solution was then washed three times with an equal volume of cold water to remove the bulk of unreacted allyl alcohol. The solution was then dried over anhydrous sodium sulfate. The dehydrating agent was removed by filtration and the benzene solvent was then removed at reduced pressure. The residue was distilled at 0.15 mm. pressure. Three cuts were taken.

|  | Temperature Range, ° C. | Yield, grams |
|---|---|---|
| Cut I | 74–79 | 10.8 |
| Cut II | 79–81 | 15.6 |
| Cut III | 82–84 | 10.8 |

*Analysis.*—Calculated for $C_8H_9NO_3$, nitrogen 8.39%. Found, nitrogent 8.04% in Cut II; 7.96% in Cut III.

This compound can also be made from allyl alcohol and N-bromomethyl maleimide by a similar procedure.

*Example 3.—Polymerization of N-Allyloxymethyl Maleimide*

N-allyloxymethyl maleimide, prepared as described above, was warmed with one percent of benzoyl peroxide at 50° C. for 16 hours, and then 1 hour at 100° C. The homopolymeric product was a clear brittle solid which may be used for the potting of electrical or electronic components that may be subjected to high temperature conditions.

In polymerizing N-allyloxymethyl maleimide, the temperature and time may be varied depending on the free-radical catalyst employed. Potting is performed by adding the catalyst to the liquid polymerizable monomer and pouring this into a mold in which the unit to be potted is suspended. The liquid completely surrounds the unit and hardens in place under conditions regulated to cause polymerization of the monomer to a solid.

*Example 4.—Copolymer of N-Allyloxymethyl Maleimide*

Equal parts by weight of N-allyloxymethyl maleimide, prepared as described above, and an unsaturated polyester which is a fusible, resinous alkyd prepared from 1.05 moles ethylene glycol, 1 mole maleic anhydride and 0.25 mole dicyclopentadiene and prepared according to U.S. Patent No. 2,671,070, were warmed with one percent of benzoyl peroxide at 50° C. for 16 hours, and then one hour at 100° C. The copolymeric product was a clear straw-colored solid which may also be used in the potting of electrical or electronic components.

*Example 5.—Glass Cloth Laminate Impregnated With Copolymeric N-Allyloxymethyl Maleimide*

Parts by weight

N-allyloxymethyl maleimide (prepared as described above) _____ 100
Triallyl cyanurate _____ 100
Alkyd (described in preceding example) _____ 200
Benzoyl peroxide _____ 8

The above ingredients were warmed to form a homogeneous solution. The solution was used to impregnate 12 plies of 181–Garan [1] finished glass cloth. The plies were laminated and cured by heating in a heated press under 15 p.s.i. at 80° C. for 0.5 hour and at 120° C. for 2 hours. The cured laminate is clear and translucent.

Test pieces were exposed to a temperature of 500° F. and flexural strength measured at intervals. The results obtained show that significant strength is retained even at high temperatures.

| Hours Aged at 500° F. | Test Temperature, ° F. | Flexural Strength (p.s.i.) |
|---|---|---|
| 0 | 70 | 58,400 |
| 24 | 500 | 21,200 |
| 72 | 500 | 15,300 |

*Example 6.—Copolymer of N-Allyloxymethyl Maleimide*

Equal parts by weight of N-allyloxymethyl maleimide (prepared as described above) triallyl cyanurate, and the alkyd resin described in Example 4 were warmed with one percent of benzoyl peroxide at 50° C. for 16 hours, and then one hour at 100° C. The copolymer resin obtained can be used as an impregnant for glass cloth laminates according to the method described in Example 5 with equivalent results.

From the foregoing general discussion and detailed specific examples, it will be seen that the novel compound, N-allyloxymethyl maleimide, provided by this invention, is a product of considerable technical excellence which may be polymerized and copolymerized to yield valuable commercial and industrial products. In accordance with the process of this invention, the subject compound may be prepared from the readily and cheaply available allyl alcohol and N-halomethyl maleimide, by the use of readily available equipment and with only moderately skilled attendance.

Having thus described my invention, what I claim and desire to protect by Letters Patent is:

1. N-allyloxymethyl maleimide.
2. Polymers of compounds selected from the class consisting of (1) N-allyloxymethyl maleimide; (2) a mixture of N-allyloxymethyl maleimide and an unsaturated polyester copolymerizable therewith; and (3) a mixture of N-allyloxymethyl maleimide, copolymerizable triallyl cyanurate and a copolymerizable unsaturated polyester.
3. Homopolymeric N-allyloxymethyl maleimide.
4. Copolymers of N-allyloxymethyl maleimide with an unsaturated polyester copolymerizable therewith.
5. Copolymers of N-allyloxymethyl maleimide with copolymerizable triallyl cyanurate and an unsaturated polyester.

References Cited in the file of this patent

UNITED STATES PATENTS 2,650,215    Strain _____ Aug. 25, 1953
2,865,730    Gates _____ Dec. 23, 1958

[1] A weave of glass cloth; the composition of the Garan finish is proprietary and believed to be a vinyl silane.